United States Patent [19]

Lileck

[11] 4,108,966
[45] Aug. 22, 1978

[54] PREPARATION OF IODINE PENTAFLUORIDE BY DIRECT FLUORINATION OF MOLTEN IODINE

[75] Inventor: John Theodore Lileck, Tamaqua, Pa.

[73] Assignee: Air Products & Chemicals, Inc., Allentown, Pa.

[21] Appl. No.: 845,695

[22] Filed: Oct. 26, 1977

[51] Int. Cl.$^2$ .............................................. C01B 7/24
[52] U.S. Cl. .................................................. 423/466
[58] Field of Search .............................. 423/466, 462

[56] References Cited

U.S. PATENT DOCUMENTS 3,336,111  8/1967  Watson et al. ...................... 423/469

Primary Examiner—O. R. Vertiz
Assistant Examiner—Thomas W. Roy
Attorney, Agent, or Firm—Richard A. Dannells; Barry Moyerman

[57] ABSTRACT

Iodine pentafluoride is produced from gaseous fluorine and molten iodine by contacting the iodine with fluorine in a reaction zone maintained at a temperature in the range of about 114° to about 280° C. The process results in high yields of pure iodine pentafluoride.

8 Claims, 1 Drawing Figure

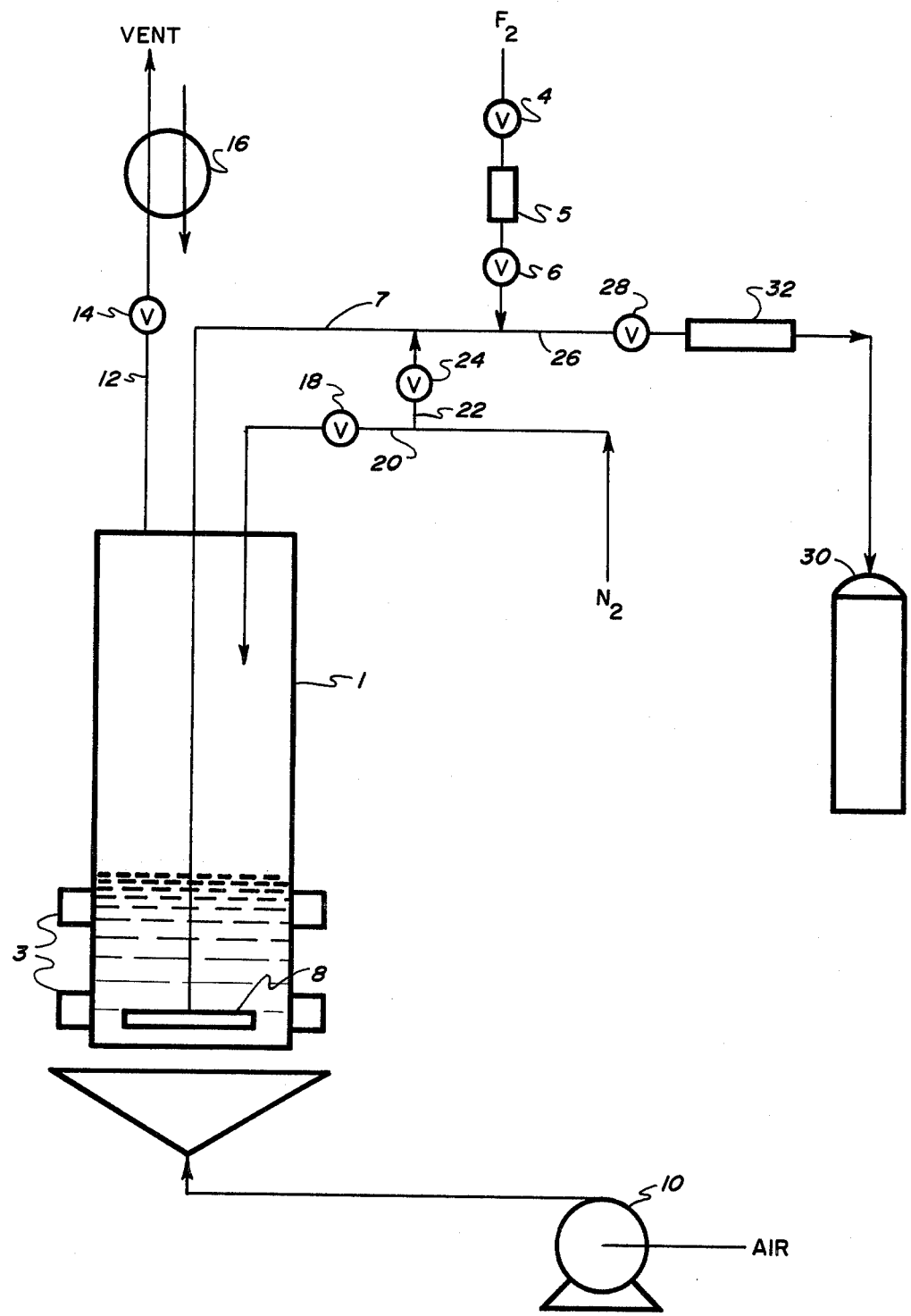

PREPARATION OF IODINE PENTAFLUORIDE BY DIRECT FLUORINATION OF MOLTEN IODINE

BACKGROUND OF THE INVENTION

1. Field of the Invention

This invention relates to an improved process for the preparation of iodine pentafluoride.

2. Description of the Prior Art

It is known to produce iodine pentafluoride ($IF_5$) by reacting gaseous fluorine with solid iodine crystals; see Schumb et al., "Iodine Heptafluoride," Industrial and Engineering Chemistry, Vol. 42, July 1950, pp. 1383-1386. One of the disadvantages of this process is that the bed of solid iodine crystals serves as a poor heat transfer medium. This causes hot spots to develop in the reaction zone leading to poor temperature control. Additionally, iodine heptafluoride ($IF_7$) formed by the reaction between the $IF_5$ product vapors and the excess flourine is greatly aggravated by these hot spots in the reaction zone. Another disadvantage is the plugging of the process lines downstream from the reaction zone by the recrystallization of iodine.

A current commercial method for the production of $IF_5$ is disclosed in Tepp, U.S. Pat. No. 3,367,746 in which gaseous fluorine is reacted with iodine dissolved in an inert solvent such as the $IF_5$ product. The temperature of the reaction is critical and must be maintained below 98° C, the boiling point of the $IF_5$ solvent. The chief disadvantage of this process is the requirement for a large number of reaction vessels and auxiliary equipment in order to dissolve the iodine in the $IF_5$ solvent and to return the resulting iodine solution to the reaction zone.

SUMMARY OF THE INVENTION

In contrast to these prior art methods, the process of the present invention has improved heat transfer throughout the reaction zone resulting in excellent temperature control and high yields of $IF_5$, has practically no plugging problems due to iodine recrystallization nor yield losses due to the formation of $IF_7$, and utilizes a minimum of process vessels and equipment resulting in obvious economies. The heat of exothermic reaction in the present process is transferred to the iodine in its molten state which is more easily cooled by conventional heat exchange techniques to avoid the formation of hot spots in the reaction zone.

The improved process comprises contacting iodine in a molten state with gaseous fluorine in a reaction zone at a temperature in the range of about 114° to 280° C, preferably 120° to 160° C. The pressure in the reaction zone is held at or above the vapor pressure of $IF_5$ to prevent the loss of product material and to lessen the formation of by-product $IF_7$. The pressure of the reaction generally ranges from about 160 kilopascals (23 psia) to 7,600 kilopascals (1100 psia), preferably 195 kilopascals (28 psia) to 630 kilopascals (91 psia).

A BRIEF DESCRIPTION OF THE DRAWING

The drawing is a process flow diagram of the process of the present invention.

DETAILED DESCRIPTION AND EXAMPLE OF THE PRESENT INVENTION

A total of 4,777 grams (10.5 pounds) of iodine crystals were initially charged to nickel reactor 1 equipped with external heating means which in this instance, was heating coil 3. The iodine was melted and maintained at 121° C (250° F) by means of conventional temperature controlling equipment not shown. Elemental fluorine was introduced through valve 4, flow meter 5, valve 6, line 7 and sparger 8 immersed below the liquid level of iodine in reactor 1. Any suitable means can be used to uniformly distribute the fluorine in the form of fine bubbles adjacent to the bottom of the reactor.

Typically, fluorine has a purity of 99% with hydrofluoric acid and nitrogen being the major impurities. The rate of introduction of the fluorine was maintained at an average rate of approximately 14 cubic meters per hour per square meter of iodine (46 ft.$^3$/hr./ft.$^2$) which assisted in maintaining the reactor temperature within the optimum temperature range of 121° to 131° C (250°-270° F). The practical range for the introduction rate of fluorine can be as low as 2.5 m.$^3$/hr./m.$^2$ of iodine (8 ft.$^3$/hr./ft.$^2$) to as high as 50 m.$^3$/hr./m.$^2$ of iodine (163 ft.$^3$/hr./ft.$^2$) or even higher depending on removal of the heat of reaction from the system. Upon commencement of the exothermic reaction, heating coil 3 was shut off and external cooling means, which in this example, was air blower 10, was used to remove the heat of reaction from reactor 1. The pressure in reactor 1 was maintained in the range of 212 kilopascals (30.7 psia) to 308 kilopascals (44.7 psia) by periodically venting reactor 1 through line 12, valve 14 and condenser 16. Condenser 16 allowed gas impurities such as nitrogen, HF and fluorine to be vented from the system and to condense any $IF_5$ that was entrained in the gaseous impurities for return to reactor 1. After 3,482 grams (7.7 pounds) of fluorine had been added to reactor 1, nitrogen was introduced into the reactor through valve 18 and line 20 to maintain the desired pressure in the reactor. Nitrogen was also employed to pass through line 22 and valve 24 to purge product line 26. It is obvious that other gases inert to the $IF_5$ reaction can be employed for this purpose.

The reaction was terminated after the temperature of the reactor began to decrease for a total reaction time of approximately 19 hours. Upon completion of the reaction, 7,486 grams (16.5 pounds) of $IF_5$ product was transferred from reactor 1 via lines 7 and 26 through valve 28 to storage vessel 30. The $IF_5$ yield based on iodine was 98% and based on fluorine was 92%.

As shown in the drawing, the $IF_5$ product was pressured through sparger 8 and line 7 by means of nitrogen introduced through line 20. Alternatively, the product can be pressured from the reactor through a separate lines by means of any suitable inert gas.

Due to the particular sparging system of this example, 454 grams of iodine were found unreacted at the bottom of the reactor. Preferably, the fluorine should be introduced as close to the bottom of the reactor to prevent such an occurrence.

The product quality was maintained by monitoring the color of the product as it passed through transparent section 32 of line 26. Trace amounts of free iodine in the product leads to its discoloration. Chemical analyses have shown that a free iodine content in the product of less than 0.015% results in a product having a light orange color. The present process process produced a high purity product essentially water white in color.

A specific mode of operating the process of the present invention on a batch basis has been described. It is contemplated that this process can be run on a continuous basis by providing for the continuous introduction of iodine and continuous removal of $IF_5$ product by techniques obvious to one skilled in the art. Other variations can be made to the process without departing from the spirit of the invention. All such variations that fall within the scope of the appended claims are intended to be embraced thereby.

I claim:

1. A process for producing iodine pentafluoride from iodine and gaseous fluorine which comprises contacting said fluorine with iodine in a molten state in a reaction zone maintained at a temperature in the range of about 114° to 280° and at a pressure in the range of about 160 to 7,600 kilopascals to effect a reaction between said fluorine and molten iodine and recovering the resulting iodine pentafluoride.

2. A process for producing iodine pentafluoride which comprises introducing gaseous fluorine through iodine in a molten state below the liquid level in a reaction zone to effect a reaction between said fluorine and molten iodine, maintaining the temperature in the reaction zone in the range of about 120° to 160° C, maintaining the pressure in the range of about 195 to 630 kilopascals by the introduction of an inert gas into the reaction zone, and recovering the resulting iodine pentafluoride from the reaction zone.

3. The process as in claim 2 wherein said inert gas is nitrogen.

4. The process as in claim 2 wherein the iodine is continuously introduced into said reaction zone and the iodine pentafluoride is continuously removed from said reaction zone.

5. The process as in claim 2 wherein the fluorine is introduced in said reaction zone through means to uniformly distribute the fluorine in the form of bubbles below the liquid level of iodine.

6. The process as in claim 5 wherein said reaction zone is a vertical reactor having a sparger adjacent to its bottom for uniformly distributing the fluorine in the iodine.

7. The process as in claim 6 wherein the iodine pentafluoride is pressured from said reaction zone by means of an inert gas.

8. The process as in claim 7 wherein said inert gas in nitrogen.

* * * * *